April 7, 1925.

T. S. MILLER

THRUSTING MECHANISM

Filed July 7, 1922

1,532,542

2 Sheets-Sheet 1

INVENTOR.
Thomas Spencer Miller
BY
Gifford & Bull,
ATTORNEYS

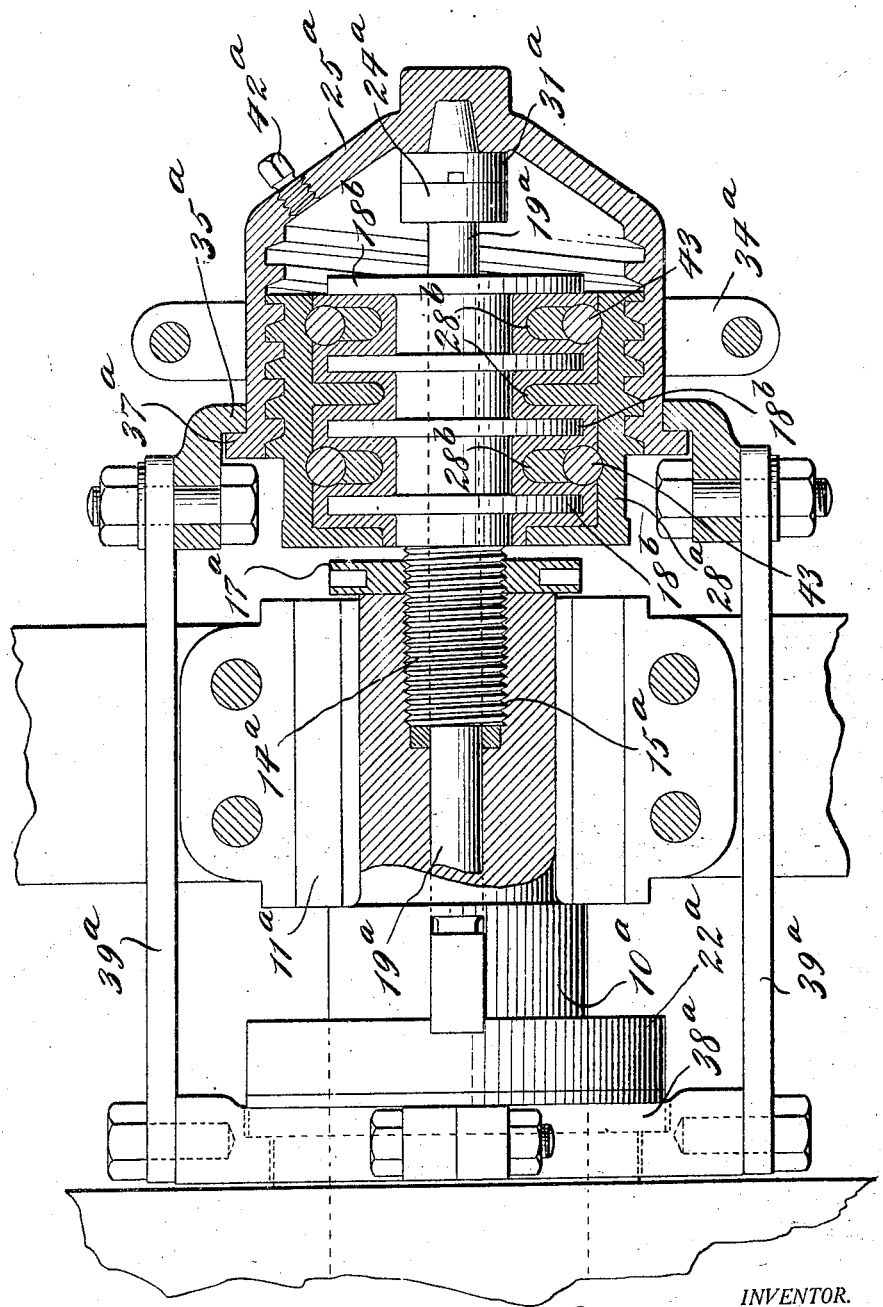

Patented Apr. 7, 1925.

1,532,542

UNITED STATES PATENT OFFICE.

THOMAS SPENCER MILLER, OF SOUTH ORANGE, NEW JERSEY.

THRUSTING MECHANISM.

Application filed July 7, 1922. Serial No. 573,498.

*To all whom it may concern:*

Be it known that I, THOMAS SPENCER MILLER, a citizen of the United States, and a resident of South Orange, in the county of Essex and State of New Jersey, have invented certain new and useful Improvements in Thrusting Mechanisms, of which the following is a specification.

My invention consists of certain novel parts and combination of parts, particularly pointed out in the claims.

The following is a description of a thrusting mechanism embodying my invention in the form at present preferred by me, but it will be understood that various modifications and changes may be made therein without departing from the spirit of my invention and without exceeding the scope of my claims.

Figure 1:
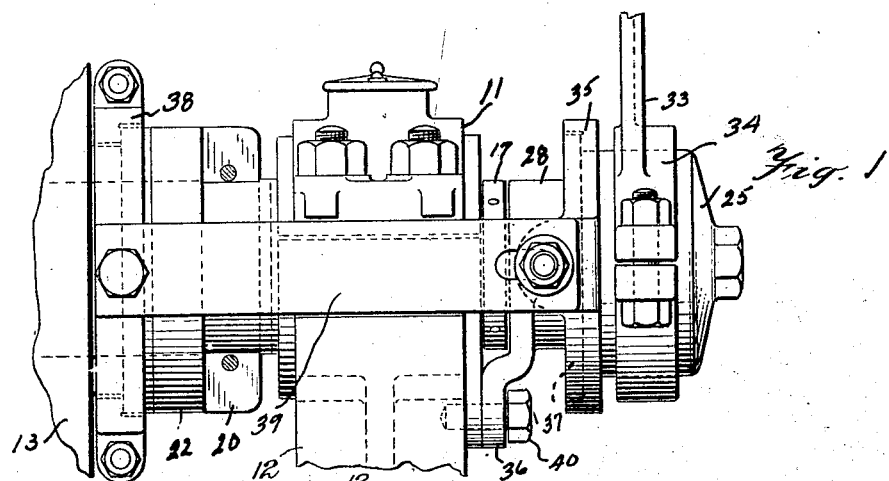
Figure 2:
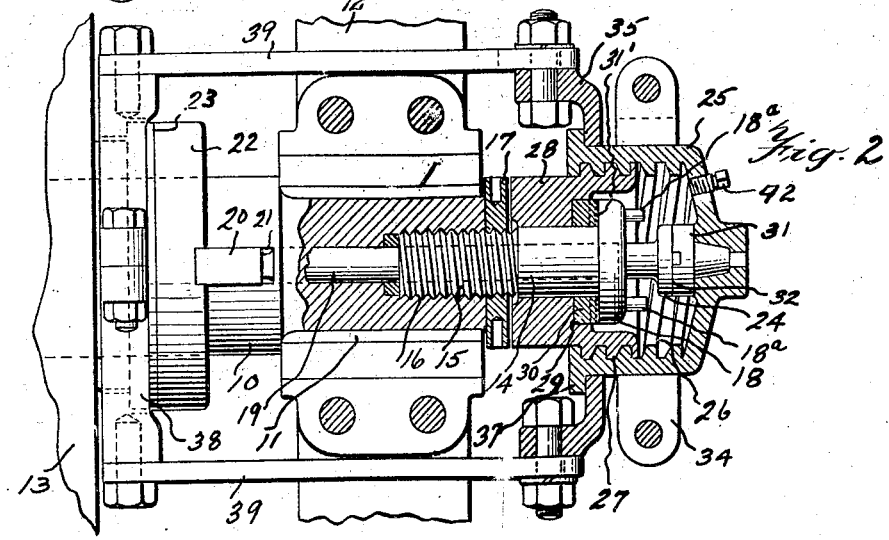
Figure 3:
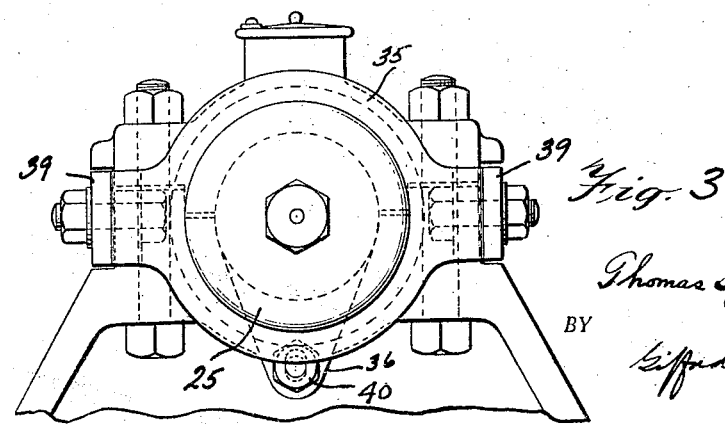

My invention will best be understood by reference to the accompanying drawings, in which Figure 1 is a side view of a mechanism embodying my invention; Fig. 2 is a plan view, partially in section, of Fig. 1; Fig. 3 is an end view as viewed from the right of Fig. 1, and Fig. 4 is a plan view, partially in section, similar to Fig. 2, and illustrating a modified form of my invention.

Like reference characters indicate like parts throughout the drawings.

Referring, now, to the drawings, 10 is a shaft, one of the bearings of which is indicated at 11 in the frame 12. A friction member 13, such as a drum, gear, pulley, etc., is slidably mounted on the shaft 10, it being understood that the movement of the member 13 longitudinally of the shaft is resisted by a member secured to the shaft beyond the opposite end of the member 13. A thrust-resisting member 14 is preferably provided, and preferably formed with a screw-threaded portion 15 engaging a screw-threaded opening 16 in the end of the shaft 10, the thrust-resisting member 14 being secured in position by a lock-nut 17. The outer end of the thrust-resisting member 14 is preferably provided with a flange 18, for a purpose which will presently appear, the enlarged head being formed with pins 18ª by which the member 14 may readily be turned. A thrust pin 19 is received in an opening extending axially of the shaft, the inner end of the thrust pin 19 engaging a key 20 which is received in a slot 21 extending through the shaft, the key engaging a friction disc 22, which, in turn, engages the end of the friction member 13, as at 23. The thrust pin 19 also extends through and beyond the thrust-resisting member 14, and is preferably provided at its outer end with an enlarged head 24.

The thrust-producing means comprises a chambered cap 25, preferably screw-threaded on its interior, as at 26, the screw-threads engaging the screw-threaded portion 27 of a collar 28 surrounding the thrust-resisting member 14, and preferably formed with a shoulder 29 between which and the flange 18 is disposed an anti-friction member 30, which is here illustrated as an anti-friction disc, but which obviously might be formed by anti-friction balls or rollers, or other form of anti-friction device, the face of the friction disc which engages the flange 18 of the thrust-resisting member preferably being provided with radial grooves 31′, indicated in dotted lines in Fig. 2, to provide for the better distribution of the lubricating material between the faces of the head 18 of the thrust-resisting member and the friction disc 30. It will be understood that the friction disc 30 is preferably formed of a material different from that of the thrust-resisting member, and particularly from the head 18 thereof, which forms a bearing surface. The collar 28 is held from rotation by the arm 36 and the bolt 40 passing through the arm into the bearing 11. The hole in the arm 36 may be slotted to prevent binding as the shaft wears in its bearing.

The cap 25 is operatively related to the thrust pin 19, a bearing member 31 of the form indicated in Fig. 2 being carried by the outer end of the cap, and the inner end of said bearing member engaging the enlarged head on the end of the pin, as at 32, it being understood that the member 31 is formed of a material different from that of the enlarged head of the pin to furnish a good anti-friction bearing. The cap 25 is rotated to operate the friction member 13 by any suitable means, such as a handle 33 secured to the cap in any desired manner, preferably by a split hub 34, which permits angular adjustment of the handle on the cap.

Mechanism is also preferably provided for moving the friction member 13 in the opposite direction when the cap is moved in the opposite direction. In the form illustrated, this mechanism comprises an annular ring or plate 35 formed with a central opening which fits around the cap 25. The inner end of the cap 25 is preferably provided with a radial flange 37, which is engaged by the ring 35, as illustrated in Fig. 2. A collar 38 is received in an annular groove formed on the right-hand end of the friction member 13, as viewed in Fig. 2, and is connected to the annular ring 35 by two or more bars 39, which are preferably bolted at their ends to the ring 35 and to the collar 38, respectively.

The chambered cap 25, together with the collar 28, forms a chamber into which lubricating material may be introduced through an opening formed in the cap 25, which opening may be closed by a plug 42. The lubricating material in the chamber serves to furnish lubrication to the bearing between the bearing member 31 and the enlarged head 32 of the thrust pin, and between the flange 18 on the thrust-resisting member and the friction disc 30. Furthermore, the oil or other lubricating material in the chamber serves to carry away the heat from the bearings by convection, the relatively large surface of the cap 25 serving to dissipate the heat, fins being added to the cap if desired to assist in radiating the heat. The cap 25 covering the enclosed bearings prevents access of dirt and other foreign matter to the bearings.

The operation of the device embodying my invention will readily be understood from the foregoing description, and is as follows: When it is desired to rotate the friction member 13, the cap 25 is turned onto the collar 28 and the bearing member 31 carried within the cap thereby pressed against the end of the pin 19, forcing the same to the left and through the key 20, bringing the friction disc 22 into operative engagement with the end of the drum. By rotating the cap 25 in the opposite direction, the thrust pin 19 is withdrawn and operative engagement between the friction disc 22 and the end of the drum is released. At the same time, the movement to the right, as viewed in Fig. 2, of the cap 25 through the yoke member comprising the bars 39, pulls the friction member 13 to the right.

In Fig. 4 I have illustrated a modified form of my invention, in which parts similar to those of Figs. 1, 2 and 3 are indicated by similar reference characters but with the exponent $a$. Under some conditions, a larger bearing surface between the thrust-resisting member and the collar engaged by the cap cover is desirable, and the form of my invention illustrated in Fig. 4 provides for such increased surface. In the arrangement there illustrated, the thrust-resisting member $14^a$ is provided with a plurality of thrust-resisting bearing discs $18^b$. The screw-threaded collar $28^a$, which is engaged by the cap $25^a$, is preferably provided with a plurality of inwardly extending rings $28^b$, which are located between the bearing discs $18^b$, the parts being so arranged as to provide a substantial clearance between the two, into which a self-lubricating material, such as Babbitt metal, may be poured to form the bearing surfaces. The collar $28^a$ is split and held together by bolts 43 in the usual manner. The general operation of the device illustrated in Fig. 4 is the same as that described in connection with Fig. 2, and it is believed that no further description is necessary.

Wear between the parts may be compensated for in the arrangement described. Wear in the surfaces at the left of Fig. 2 will be taken up by rotation of the nut 25, and when this rotation leaves the handle 33 in an inconvenient position, it may be adjusted by means of the split nut 34. Wear between the head 18 and the anti-friction disc 30 may be taken up by adjusting the position of the member 14. The lock-nut 17 is loosened and the member 14 turned by engaging the pins $18^a$ with a suitable tool, when the lock-nut 17 is again tightened.

While the surface between the head 18 and the member 30 is farther from the center of the shaft than the friction surface 32 at the end of the pin 19, and therefore turns at a higher speed, nevertheless this increased speed is compensated for by the larger surface beneath the head 18, which may be made as large as necessary to reduce the pressure per square inch to offset the higher speed. Thus, both the thrust-producing and the thrust-resisting surfaces may be equalized, so far as wear is concerned, though one is farther from the center than the other.

It will be understood that the arrangement described is merely illustrative and that the embodiment of the invention may be widely varied.

What I claim and desire to secure by Letters Patent of the United States is:

1. In combination, a shaft, a friction member mounted thereon, thrust-producing means for said friction member comprising a thrust pin extending axially of and beyond the shaft, a chambered cap screw threaded on its interior enclosing the end of said pin, a bearing member carried by said cap and adapted to engage the end of said pin, means for moving said cap longitudinally of the axis of said shaft and thereby moving said thrust pin, and means provided with screw-threads engaging with the screw-threads of said chambered cap for resisting the movement of said thrust-producing mechanism, said cap serving as a receptacle for lubricating material.

2. In combination, a shaft, a friction member mounted thereon, thrust-producing means for said friction member comprising a thrust pin extending axially of and beyond the shaft, a chambered cap screw threaded on its interior enclosing the end of said pin, a bearing member carried by said cap and adapted to engage the end of said pin and of a different material therefrom, means provided with screw-threads engaging with the screw-threads of said chambered cap for moving said cap longitudinally of the axis of said shaft and thereby moving said thrust pin, and means for resisting the movement of said thrust-producing mechanism, said cap serving as a receptacle for lubricating material.

3. In combination, a shaft, a thrust-resisting member adjustably secured to said shaft, a friction member mounted on said shaft, thrust-producing means for said friction member comprising a thrust pin extending through said thrust-resisting member and axially of the shaft, a screw-threaded collar surrounding said thrust-resisting member and a chambered cap having screw-threads engaging those of said collar, said cap enclosing the end of said pin and being operatively related thereto, whereby the rotation of said cap produces longitudinal movement of said thrust pin, and means for rotating said cap.

4. In combination, a shaft, a thrust-resisting member on said shaft and having a flanged end, a friction member mounted on said shaft, thrust-producing means for said friction member comprising a thrust pin extending through said thrust-resisting member and axially of the shaft, a screw-threaded collar surrounding said thrust-resisting member and a chambered cap having screw-threads engaging the screw-threads of said collar, said cap enclosing the end of said pin and being operatively related thereto, whereby the rotation of said cap produces longitudinal movement of said thrust pin, and means for rotating said cap.

5. In combination, a shaft, a thrust-resisting member having a flanged end and adjustably secured to said shaft, a friction member mounted on said shaft, thrust-producing means for said friction member comprising a thrust pin extending through said thrust-resisting member and axially of the shaft, a screw-threaded collar surrounding said thrust-resisting member and a chambered cap having screw-threads engaging the screw-threads of said collar, said cap enclosing the end of said pin and being operatively related thereto, whereby the rotation of said cap produces longitudinal movement of said thrust pin, and means for rotating said cap, said cap and said collar forming a chamber for lubricating material for the bearings.

6. In combination, a shaft provided with a screw-threaded opening, a thrust-resisting member provided with screw-threads engaging the threads of said shaft, whereby said thrust-resisting member may be adjustably secured to said shaft, a friction member mounted on said shaft, thrust-producing means for said friction member comprising a thrust pin extending through said thrust-resisting member and axially of said shaft, a screw-threaded collar surrounding said thrust-resisting member and a chambered cap having screw-threads engaging the screw-threads of said collar, said cap enclosing the end of said pin and being operatively related thereto, whereby the rotation of said cap produces longitudinal movement of said thrust pin, and means for rotating said cap.

7. In combination, a shaft, a friction member mounted thereon, thrust-producing means for said friction member comprising a thrust pin extending axially of the shaft, a thrust-resisting member screwed into said shaft, a cap enclosing the end of said thrust pin and operatively related thereto, whereby movement of said cap axially of the shaft moves said pin, means operatively related to said cap for moving said friction member in a direction opposite to that in which it is moved by said thrust-producing mechanism, means for moving said cap longitudinally of the axis of said shaft and means for adjusting said thrust-resisting member longitudinally of the shaft.

8. In combination, a shaft, a thrust-resisting member extending axially of said shaft, a friction member mounted on said shaft, thrust-producing means for said friction member comprising a thrust pin extending through said thrust-resisting member and axially of the shaft, a screw-threaded collar surrounding said thrust-resisting member and a chambered cap having screw-threads engaging those of said collar, said cap enclosing the end of said pin and being operatively related thereto, whereby the rotation of said cap produces longitudinal movement of said thrust pin, and means for rotating said cap.

THOMAS SPENCER MILLER.

Certificate of Correction.

It is hereby certified that in Letters Patent No. 1,532,542, granted April 7, 1925, upon the application of Thomas Spencer Miller, of South Orange, New Jersey, for an improvement in " Thrusting Mechanisms," an error appears in the printed specification requiring correction as follows: Page 3, claim 2, line 13, beginning with the word " provided " strike out all to and including the word " cap," first occurrence, in line 15, and insert the same after the word " means " in line 17 of same claim; and that the said Letters Patent should be read with these corrections therein that the same may conform to the record of the case in the Patent Office.

Signed and sealed this 12th day of May, A. D. 1925.

[SEAL.]
KARL FENNING,
*Acting Commissioner of Patents.*